US008089503B2

(12) United States Patent
Bruce et al.

(10) Patent No.: US 8,089,503 B2
(45) Date of Patent: Jan. 3, 2012

(54) SYSTEM AND METHOD OF MESSAGE NOTIFICATION AND ACCESS VIA A VIDEO DISTRIBUTION NETWORK

(75) Inventors: Les D. Bruce, Chicago, IL (US); Jeffrey L. Brandt, Cedar Park, TX (US); Marc A. Sullivan, Austin, TX (US); Mark B. Hubscher, San Antonio, TX (US); Carissa Hernandez, Houston, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1450 days.

(21) Appl. No.: 11/592,707

(22) Filed: Nov. 3, 2006

(65) Prior Publication Data

US 2008/0109839 A1 May 8, 2008

(51) Int. Cl.
*H04N 7/14* (2006.01)
(52) U.S. Cl. .................. 348/14.01; 348/14.12; 725/109; 725/110
(58) Field of Classification Search .... 348/14.01–14.07; 379/88.23, 88.25, 93.24, 93.05; 725/10, 725/110, 112, 109, 80, 137, 30; 345/334, 345/145
See application file for complete search history.

(56) References Cited

U.S. PATENT DOCUMENTS

| | | | |
|---|---|---|---|
| 5,802,166 A * | 9/1998 | Garcia et al. | 379/372 |
| 5,898,432 A * | 4/1999 | Pinard | 715/861 |
| 6,732,368 B1 | 5/2004 | Michael et al. | |
| 6,882,709 B1 | 4/2005 | Sherlock et al. | |
| 6,888,832 B2 | 5/2005 | Richardson et al. | |
| 6,983,370 B2 | 1/2006 | Eaton et al. | |
| 7,571,458 B1 * | 8/2009 | Eyal | 725/137 |
| 2002/0147988 A1 | 10/2002 | Nakano | |
| 2005/0277406 A1 | 12/2005 | Diroo et al. | |
| 2006/0218287 A1 * | 9/2006 | Dodrill et al. | 709/227 |
| 2007/0243858 A1 * | 10/2007 | Marathe et al. | 455/412.2 |
| 2007/0250845 A1 * | 10/2007 | Walter et al. | 725/10 |

FOREIGN PATENT DOCUMENTS

| | | |
|---|---|---|
| EP | 1 458 195 A2 | 9/2004 |
| EP | 1 895 723 A1 | 3/2008 |
| WO | 00/44173 A1 | 7/2000 |
| WO | 02/096077 A1 | 11/2002 |
| WO | 2006/083492 A2 | 8/2006 |

OTHER PUBLICATIONS

AT&T Unified Messaging User Guide—Texas, www.sbc.com/products_services/residential, 2003-2006 AT&T Knowledge Ventures.
IP Video Solutions—Where Entertainment and Communications Converge, www.schange.com, 2006 SeaChange International, Inc.

(Continued)

*Primary Examiner* — Melur Ramakrishnaiah
(74) *Attorney, Agent, or Firm* — Toler Law Group, PC

(57) ABSTRACT

Methods and systems of message notification and access via a video distribution network are disclosed. A method may include receiving, via an Internet Protocol Television (IPTV) network, a data stream including video content. The method may also include receiving, via the IPTV network, a notification of a message directed to a communication address associated with a subscriber. The method may also include selecting a first visual message indication based at least partially on the communication address.

41 Claims, 13 Drawing Sheets

OTHER PUBLICATIONS

AT&T Unified Messaging (SM)—Integrates voice, email, and fax. Plus Cingular wireless voice mail., www.sbc.com/products_services/residential/prodinfo_1, 2003-2006 AT&T Knowledge Ventures.

AT&T Unified Messaging (SM) Demo, www.sbc.com/gen/general, 2003-2006 AT&T Knowledge Ventures.

AT&T Unified Messaging (SM)—Learn More About AT&T Unified Messaging, www.sbcuc.net/dchelp/EN/learnaboutuc, 2006 AT&T Knowledge Ventures.

AT&T Unified Messaging (SM)—Additional Features for your AT&T Unified Messaging (UM) Mailbox, www.sbcuc.net/dchelp/EN/learnaboutaddons, 2006 AT&T Knowledge Ventures.

Timothy P. Schroeder, Melody Ho, David Dudley, Provisioning Unified Messaging System Services, U.S. Appl. No. 10/247,828.

Mary McCarthy, Tony Haeuser, Chris Lee, Ross Cox, Scott Pettit, System and Method of Delivering Notifications, U.S. Appl. No. 11/249,777.

Les Bruce, Jeffrey Brandt, Marc Sullivan, Mark Hubscher, System and Method of Providing Voice Communication, U.S. Patent Application Filed on Oct. 25, 2006.

Les Bruce, Jeffrey Brandt, Marc Sullivan, Mark Hubscher, System and Method of Providing Call Information, U.S. Patent Application Filed on Nov. 3, 2006.

International Search Report and Written Opinion of the International Searching Authority for International Application No. PCT/US2007/020316, mailed Apr. 28, 2008.

"Telecommunications and Internet Converged Services and Protocols for Advanced Networking (TISPAN); The Service Layer requirements to integrate NGN services and IPTV," European Telecommunications Standards Institute, Technical Specification, Sep. 2006, 25 pages, Sofia Antipolis, France.

J. Robert Ensor, Markus Hofmann, and Ivica Rimac, "Blending IPTV Services," IPTV Workshop, International World Wide Web Conference, May 23, 2006, 6 pages, Edinburgh, Scotland, United Kingdom.

\* cited by examiner

US 8,089,503 B2

SYSTEM AND METHOD OF MESSAGE NOTIFICATION AND ACCESS VIA A VIDEO DISTRIBUTION NETWORK

FIELD OF THE DISCLOSURE

The present disclosure is generally related to message notification and access via a video distribution network.

BACKGROUND

It is increasingly common for an individual or family to have multiple communication addresses. Some of these communication addresses may have messaging features, such as voice mail, email, fax or text messaging, to name a few. It may be inconvenient at times, such as while watching television, to regularly check communication devices associated with these communication addresses to determine whether new messages have been received. Hence, there is a need for an improved system and method of message notification and access via a video distribution network.

DETAILED DESCRIPTION OF THE DRAWINGS

In a particular embodiment, a system for message notification and access via a video distribution network may include a set top box device. The set top box device may include at least one network interface to receive a data stream including video content via an Internet Protocol Television (IPTV) network. The data stream may also include a notification of a message directed to a communication address of a subscriber. The set top box device may also include logic to select a first visual message indicator based at least partially on the communication address.

In a particular embodiment, a method of message notification and access via a video distribution network may include receiving a data stream including video content via an IPTV network. The method may also include receiving, via the IPTV network, a notification of a message directed to a communication address associated with a subscriber. The method may also include selecting a first visual message indication based at least partially on the communication address.

In another particular embodiment, a method of message notification and access via a video distribution network may include receiving a broadcast signal including video content via a cable television (CATV) network. The method may also include receiving, via the CATV network, a notification of a message directed to a communication address associated with a subscriber. The method may also include selecting a first visual message indication based at least partially on the communication address.

In a particular embodiment, a user interface for message notification and access via a video distribution network may include video content received via an IPTV system. The user interface may also include a message notification indicator associated with an incoming message received at the IPTV system. The message notification indicator may be selected based at least partially on the communication address of a destination device of the incoming message and a type of the incoming message.

Figure 1:
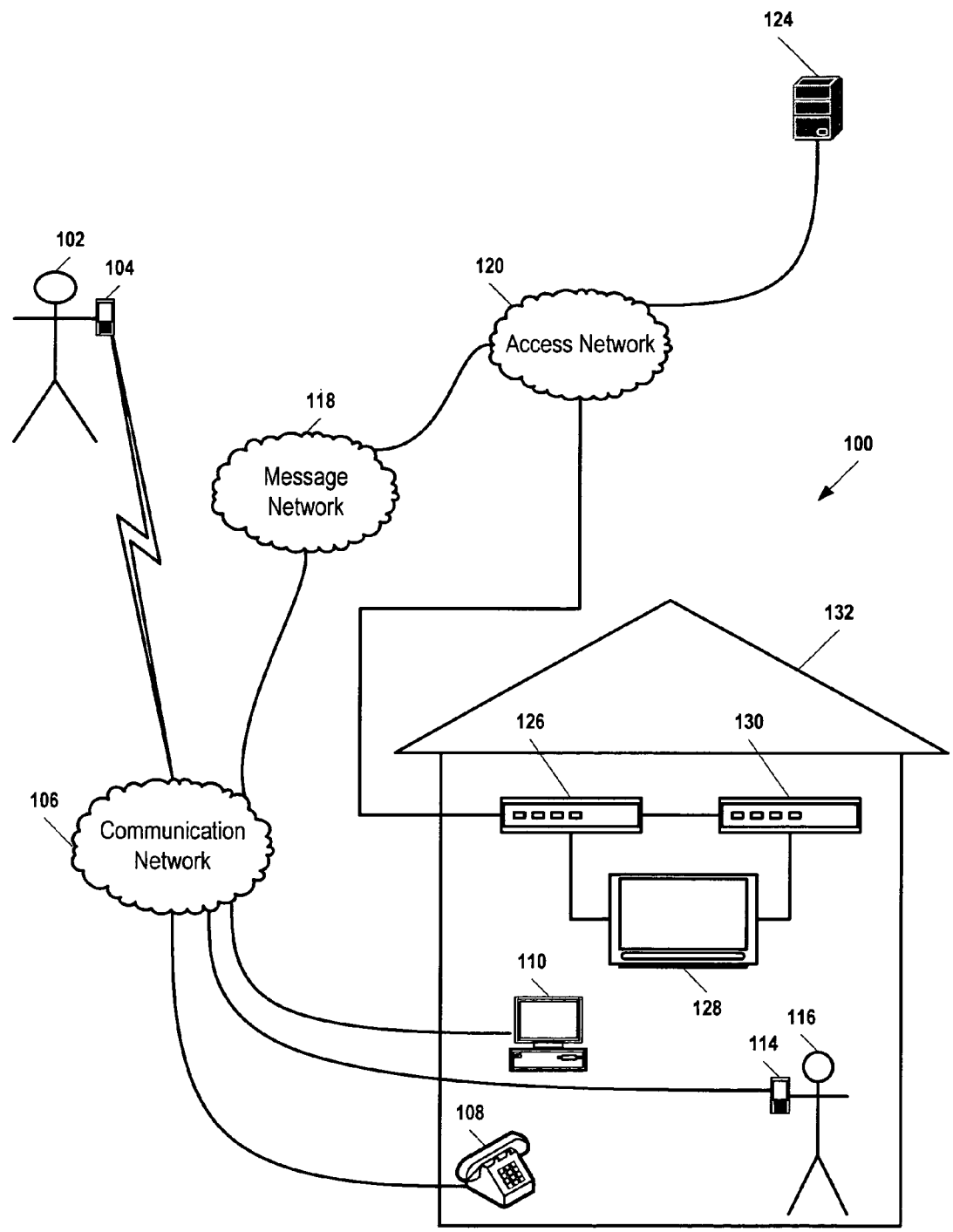
FIG. 1 is a block diagram of a first embodiment of a system to provide message notification and access via a video distribution network.

Referring now to FIG. 1, a particular embodiment of a system to provide message notification and access via a video distribution network is shown. The video distribution network 100 includes a video content server 124, at a super hub office or video head-end, for example, communicating with an access network 120. The access network 120 communicates with a message network 118 and a communication network 106. The access network 120 is also coupled to one or more subscriber residences, such as residence 132.

The video content distribution network 100 may be configured to provide video content from the video content server 124 to one or more subscribers, such as subscriber 116. For example, video content may be streamed from the video content server 124 to an internet protocol (IP) multicast group that includes the set top box device 126 at the subscriber's residence 132. The set top box device 126 may decode the streamed video content and send a display signal to a television 128 or video recording device 130. In another example, the video content distribution network may include a cable television network.

In a particular embodiment, the subscriber 116 may have one or more communication devices, such as wired telephone 108, wireless telephone 114, computer 110, another communication device, or any combination thereof. In an illustrative embodiment, each communication device may be associated with a separate communication address. Each communication device may be coupled to or in communication with the communication network 106. The communication network 106 may include any communication network, such as a telephone network, a wireless telephone network, or the Internet.

In a particular embodiment, a caller 102 attempting to communicate with the subscriber 116 may use a caller communication device 104. The caller communication device 104 may link to the communication network 106, either directly or through one or more other networks. The caller communication device 104 may communicate information such as voice data, text data, visual data, or any combination thereof. As used herein, the term "caller" is used as a generic term referring to a party attempting to communicate with or leave a message for another party, regardless of the type of communication, type of message, or medium used for the communication. For example, a "caller" may be a party sending a voice mail, email, text, fax, or other type of message. Additionally, the term "subscriber" is used herein to refer to a party utilizing methods and systems disclosed herein to receive notification of messages or access messages via a video distribution network. The term is not intended to imply or denote that a party using the embodiments disclosed here must subscribe to a particular service.

In a particular embodiment, the caller 102 may send a message to the subscriber 116 at a communication address associated with one of the subscriber's communication devices. In an illustrative embodiment, the message network 118 may receive and store messages directed to one of the subscriber's communication addresses. The message network 118 may also provide an indication of a received message to the access network 120. The access network 120 may send the indication of the received message to the set top box device 126. The set top box device 126 may notify the subscriber 116 that a message has been received by providing a visual notification of the message, for example, at the television 128. In a particular illustrative embodiment, the visual notification of the message may be selected at the message network 118 or at the set top box device 126 based at least in part on the communication address to which the message was directed, the content of the message, the type of message, the urgency of the message, subscriber configuration settings, other information about the message, or any combination thereof.

In a particular embodiment, the subscriber 116 may access contents of the message via the access network 120 or via the communication network 106. For example, the subscriber 116 may interact with the wired telephone 108, the wireless telephone 114, or the computer 110 to access the message content via the communication network 106. In another example, the subscriber 116 may interact with the set top box device 126 through a graphical user interface displayed on television 128 to access the message content via the access network 120. Examples of such a graphical user interfaces are illustrated in FIGS. 8, and 10-14.

In a particular embodiment, the subscriber 116 may modify subscriber configuration settings associated with messaging via the communication network 106, or the access network 120. In an illustrative embodiment, the subscriber configuration settings may be stored at a device in communication with the message network 118. The subscriber 116 may interact with the wired telephone 108, the wireless telephone 114, or the computer 110 to access and modify the subscriber configuration settings via the communication network 106. In another example, the subscriber 116 may interact with the set top box device 126 through a graphical user interface displayed on television 128 to access and modify the subscriber configuration settings via the access network 120. Thus, for example, the subscriber may alter how message notifications are received from the access network 120 by changing subscriber configuration settings via the communication network 106, and vice versa.

Figure 2:
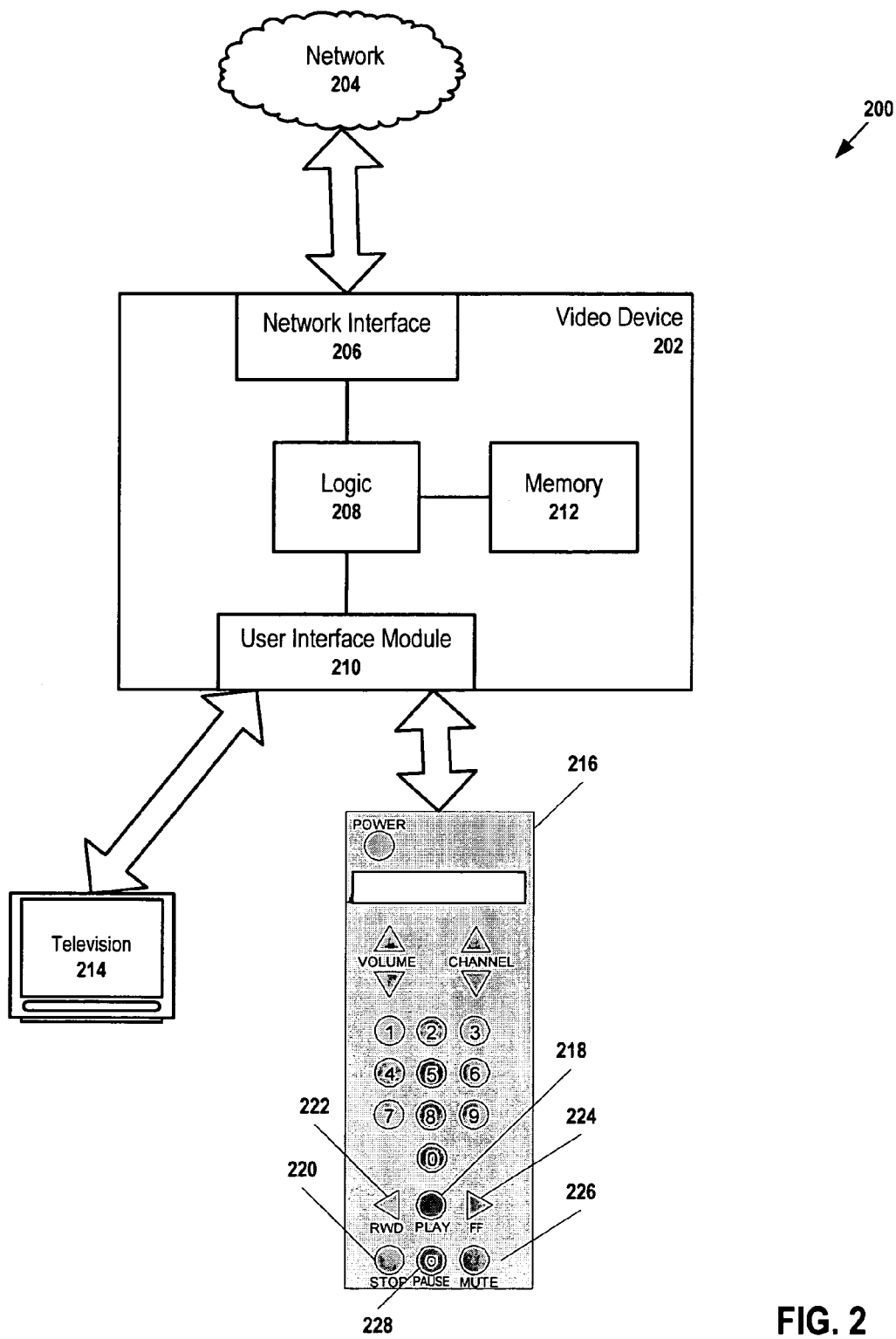
FIG. 2 is a block diagram of a second embodiment of a system to provide message notification and access via a video distribution network.

FIG. 2 depicts a second embodiment of a system to provide message notification and access via a video distribution network 200. The video distribution network 200 includes a network 204 in communication with a video device 202. The video device 202 may also be in communication with a display, such as a television 214, and a remote control device 216.

In a particular embodiment, the video device 202 may be capable of receiving a data stream including video content via the network 204. The video device 202 may also be capable of receiving a notification from the network 204 of a message directed to a communication address associated with a subscriber. The video device 202 may select a visual indication of receipt of the message based at least in part on the communication address to which the message was directed. The video device 202 may also send a display signal to the display device. The display device may display the video content and the visual indication in response to receiving the display signal.

In a particular embodiment, the video device 202 includes a network interface 206, a user interface module 210, logic 208, and memory 212. The network interface 206 may allow video device 202 to communicate with the network 204. In an illustrative embodiment, the video device 202 may communicate with the network 204 via customer premises equipment (CPE), such as a cable modem, a digital subscriber line (DSL) switch or router, or other devices. In an illustrative embodiment, the network 204 may include a video distribution network, such as an Internet Protocol Television (IPTV) network. In such an embodiment, the network interface 206 may receive a data stream including video content from the network 204. The network interface 206 may also receive other data from the network 204. For example, the network interface 206 may receive a notification of or contents of a message directed to a communication address of the subscriber from the network 204.

In a particular embodiment, the logic 208 may prepare a display signal based at least in part on data received via the network interface 206. For example, the logic 208 may form a display signal based at least in part on the content of a message, the type of the message, the urgency of the message, subscriber configuration settings, other information about the message, or any combination thereof. The subscriber configuration settings may be stored locally in memory 212, or remotely in a memory accessible via the network 204. In a particular illustrative embodiment, the logic 208 may form a first display signal including notification of receipt of the message, and a second display signal including the contents of the message. The second display signal may be formed in response to a subscriber's request to access the contents of the message.

In a particular embodiment, the user interface module 210 may receive control input from a user. For example, the control input may include control signals received from the remote control device 216. In an illustrative embodiment, the user interface module 210 may receive the control input may via a graphical user interface displayed at the television 214. The control input may include, for example, a command to display contents of one or more messages. In a particular illustrative embodiment, the control input may include a command to display contents of a plurality of messages one after another, without further control input. In another particular illustrative embodiment, the control input may include a command to access a television channel designated for display of messages. The control input may also include a command to initiate a call to a sender of the message.

In a particular embodiment, the remote control device 216 may include a plurality of selectable keys. When a user selects a key, a control signal may be communicated from the remote control device 216 to the video device 202. In an illustrative embodiment, each key may be associated with a unique control signal. In a particular illustrative embodiment, the remote control device 216 may include a plurality of keys, referred to herein as "transport keys". Transport keys may include, for example, a play key 218, a fast forward key 224, a reverse (or rewind) key 222, a stop key 220, a pause key 228, a mute key 226, other keys that control media playback, or any combination thereof. In a particular illustrative embodiment, the video device 202 may implement transport key signals to control user interaction with messages. For example, in response to receiving a notification of a message, the user may select a play key 218 to play the message. The user may also select the fast forward key 224 to move through the message, or to the next message, more quickly. Similarly, the user may select the reverse key 222 to rewind the message or go back to a previous message. The user may also stop playback of messages by selecting the stop key 220. The user may pause playback of a message by selecting the pause key 228. The user may mute playback of an audio or audiovisual message by selecting the mute key 226.

In a particular embodiment, the logic 208 may access subscriber configuration settings to select a visual indication of a message. In an illustrative embodiment, the subscriber configuration settings may be stored in memory 212. The subscriber configuration settings may include a different visual indication for each communication address of the subscriber. For example, the subscriber configuration settings may include a list of communication addresses of the subscriber and a visual indication setting that is unique among the communication address for each address in the list.

Figure 3:
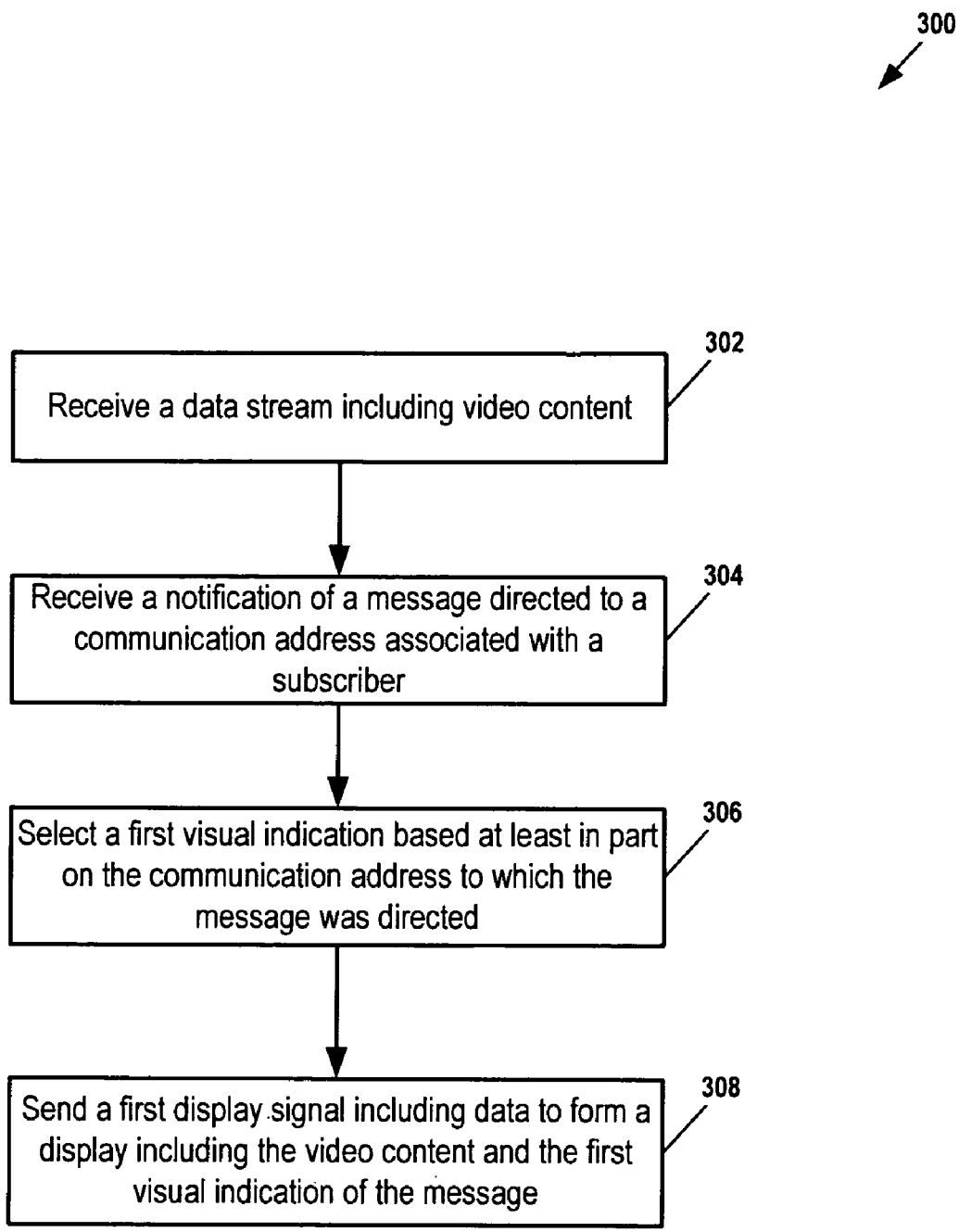
FIG. 3 is a flow chart of an exemplary embodiment of a method of message notification via a video distribution network.

FIG. 3 depicts a flow chart of an exemplary embodiment of a method 300 of message notification via a video distribution network. The method 300 includes receiving a data stream including video content, at 302. In an illustrative embodiment, the data stream may be an IPTV multicast data stream. The method 300 also includes receiving a notification of a message directed to a communication address associated with a subscriber, at 304. In a particular illustrative embodiment, the notification of the message may be received via the video distribution network.

The method 300 also includes selecting a first visual indication based at least in part on the communication address to which the message was directed, at 306. For example, a first communication address may correspond to a subscriber's wireless telephone, and a second communication address may correspond to a subscriber's wireline telephone. The first visual indication may be selected based at least in part on whether the message was addressed to the first communication address or the second communication address. In a particular embodiment, the subscriber may have a plurality of communication addresses, such as one or more facsimile numbers, one or more wireline telephone numbers, one or more wireless telephone numbers, one or more email addresses, one or more text messaging addresses, other communication addresses, or any combination thereof. In a particular illustrative embodiment, the method 300 may select a visual indication of the message that identifies to which communication address the message was directed. For example, the visual indication may identify to which communication address the message was directed by displaying the communication address. In another example, a particular icon or visual device may be associated with each communication address, and the visual indication may include the particular icon or visual device associated with the communication address to which the message was directed. The visual device may include for example, a unique placement on the display, a unique color scheme, another visual device, or any combination thereof.

The method 300 may also include, at 308, sending a first display signal. The first display signal may include data to form a display including the video content and the first visual indication of the message. In a particular embodiment, the display signal may be an analog or digital television signals.

Figure 4:
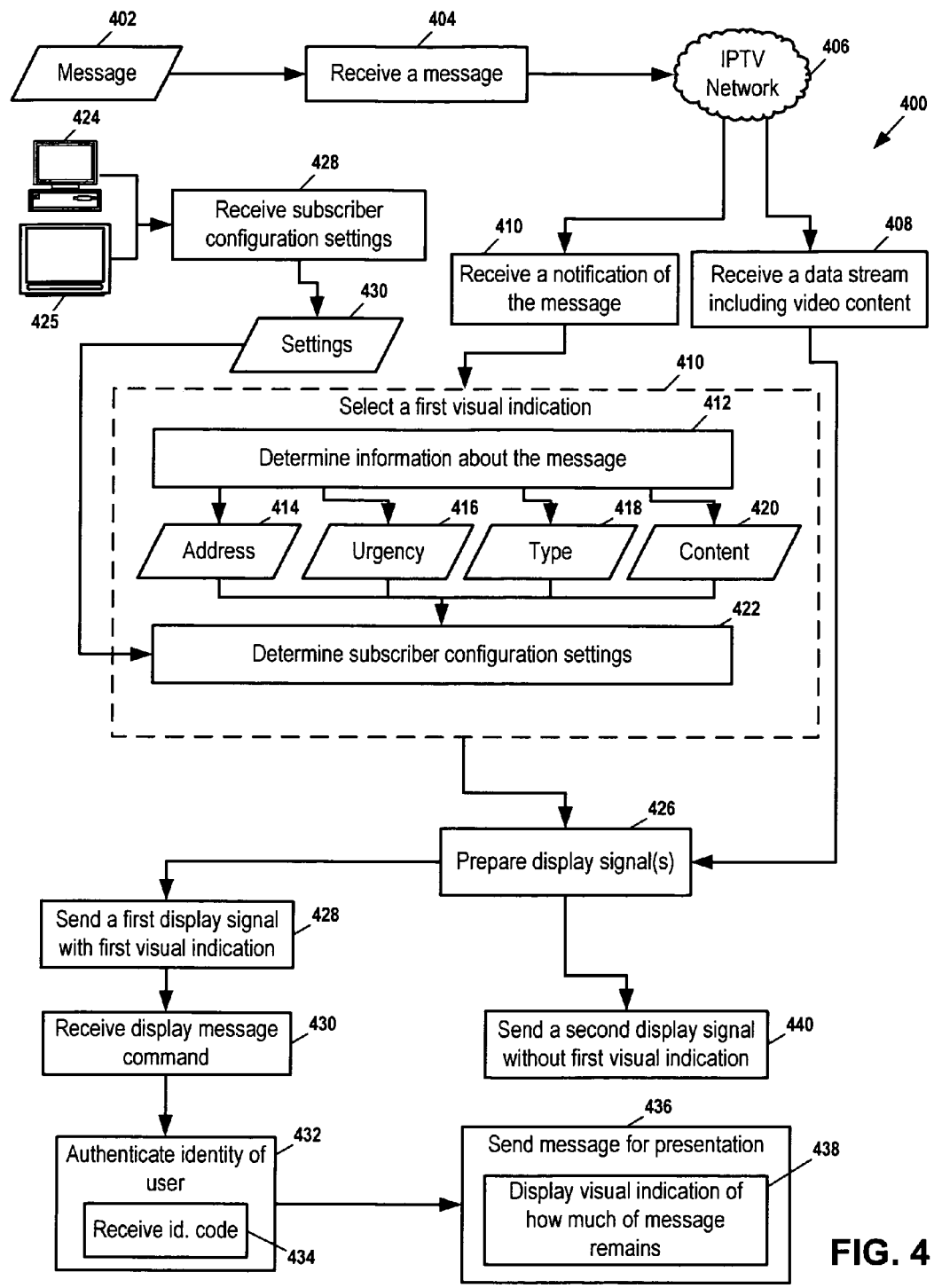
FIG. 4 is a flow chart of an exemplary embodiment of a method of message notification and access via a video distribution network.

FIG. 4 depicts a flow chart of an exemplary embodiment of a method 400 of message notification and access via a video distribution network. The method 400 includes, at 404, receiving a message 402. The message 402 may be received at a device in communication with an IPTV network 406. The method 400 also includes receiving a notification of the message 402, at 410, and receiving a data stream including video content, at 408.

The method 400 may also include selecting a first visual indication. In an illustrative embodiment, selecting the first visual indication may include determining information about the message, at 412. For example, the method 400 may determine information about the message such as the address 414 to which the message was directed, the urgency 416 of the message, the type 418 of message, the content 420 of the message, other information about the message, or any combination thereof. In a particular illustrative embodiment, the urgency 416 of the message may be specified by the sender of the message to indicate that the message is urgent, important, normal, and so forth. The type 418 of the message may be a voice message, a text message, a facsimile, an email, another type of message, or any combination thereof. In a particular embodiment, the communication address 414 may include an internet protocol communication address, such as a voice over internet protocol (VOIP) address, a wireline telephone number, a wireless telephone number, an email address, a text messaging address, or another communication address.

In a particular embodiment, selecting the first visual indication may include determining subscriber configuration settings, at 422. In such an embodiment, the method 400 may include, at 428, receiving subscriber configuration settings 430 from the subscriber. For example, the subscriber configuration settings 430 may be received via a user interface displayed at a television 425. In another example, the subscriber configuration settings may be received via a computer 424, a telephone, or another communication device.

In a particular embodiment, the method 400 may also include preparing one or more display signals, at 426. In a particular illustrative embodiment, a first display signal may be sent which includes the first visual indication, at 428. For example, the first display signal may be sent to a display device, such as television 425. The first display signal may cause the television 425 to display an image including the video content received from the IPTV network 406 and the first visual indication. In a particular embodiment, the first visual indication may overlay the video content when displayed at the television 425.

In a particular illustrative embodiment, a second display signal may be sent that does not include the first visual indication, at 440. For example, the second display signal may be sent to a recording device (not shown). Thus, the second display signal may allow the recording device to record video content received from the IPTV network 406 without recording the first visual indication.

In a particular embodiment, the method 400 may also include receiving a command to display the message, at 430. In an illustrative embodiment, the method 400 may authenticate an identity of the subscriber before sending the message to the display device, at 432. For example, the method may authenticate the identity of the subscriber by receiving an identification code, at 434. In a particular illustrative embodiment, the identification code received from the subscriber may be the same as an identification code used by the subscriber to access messages via a primary device associated with the communication address. For example, if the message is a voice mail message, the user may be requested to provide a voice mail identification code associated with the voice mail account before the content of the voice mail message is provided. In another example, if the message is an email, the user may be requested to provide an email identification code associated with the email account before the content of the email is provided.

In a particular embodiment, the method 400 may include receiving the message via the IPTV network, and, at 436, sending the message to a display device for presentation to the subscriber. In a particular illustrative embodiment, sending the message for presentation to the subscriber may include displaying a visual indication of how much of the message remains. For example, while the subscriber is reading, listening to, or viewing a message, the method may display an indication of how much of the message has not yet been presented to the subscriber.

In a particular embodiment, the steps of the methods described herein may be executed in the order shown by the figures. In alternative embodiments, the steps may be executed in alternative sequences.

Figure 5:
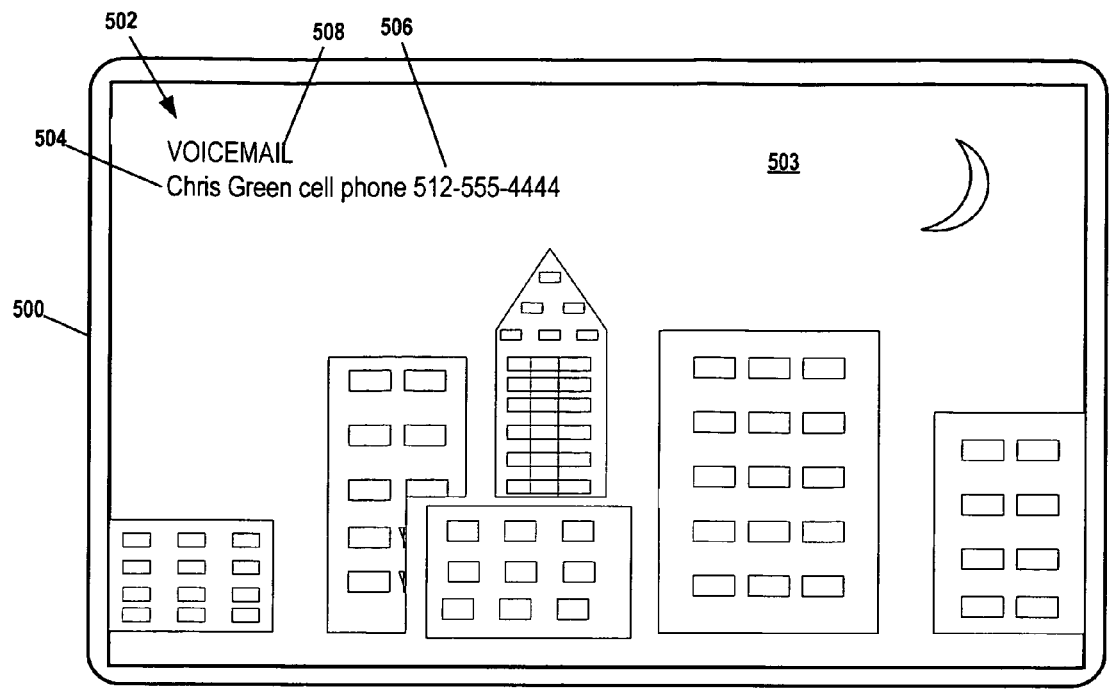
FIG. 5 is an illustration of a first exemplary embodiment of a graphical user interface for message notification via a video distribution network.

FIG. 5 depicts a first exemplary embodiment of a graphical user interface for message notification via a video distribution network. The interface 500 may include for example, a display presented on a television display device. In a particular embodiment, the interface 500 may include a visual indication 502 of a message that overlays video content 503. The visual indication 502 may include a type 508 of the message, such as "voice mail." The visual indication 502 may also include a communication address to which the message was directed, such as a telephone number 506. In a particular embodiment, the visual indication 502 may include a visual device 504 that identifies a communication device, party, or any combination thereof to which the message was directed. For example, the visual device 504 may include a text name associated with the communication address, such as "Chris Green cell phone." In another example, the visual device 504 may include an icon, color scheme, other visual device, or any combination thereof.

Figure 6:
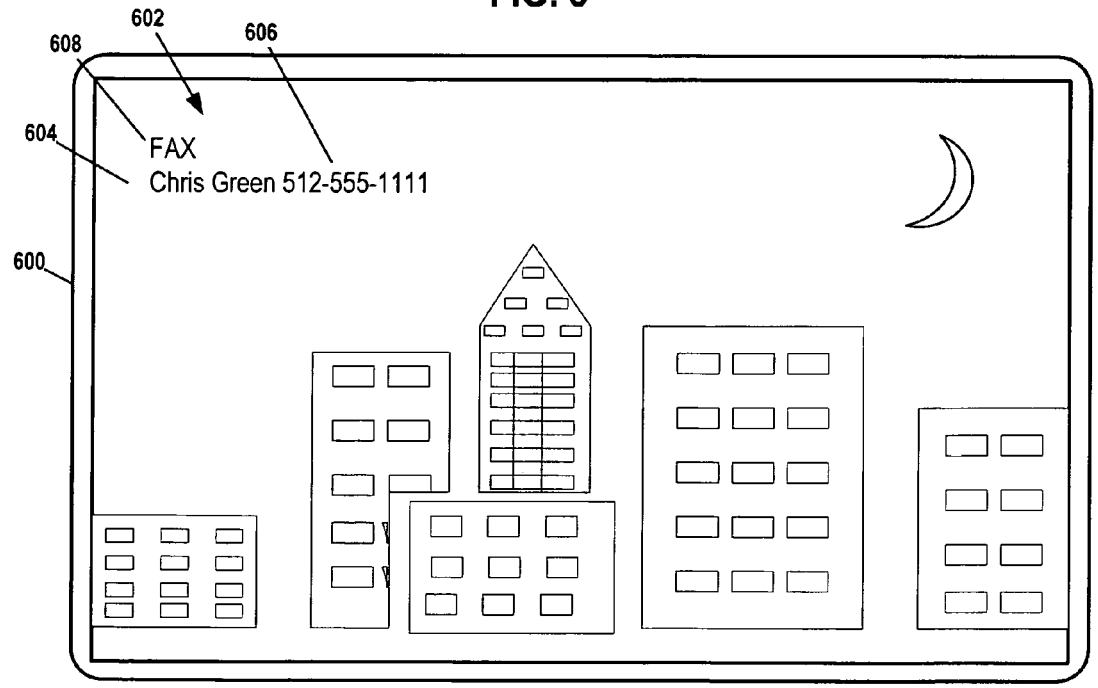
FIG. 6 is an illustration of a second exemplary embodiment of a graphical user interface for message notification via a video distribution network.

FIG. 6 depicts a second exemplary embodiment of a graphical user interface for message notification via a video distribution network. In a particular embodiment, the interface 600 may include a visual indication 602 of a message. The visual indication 602 may include a type 608 of the message, such as "fax." The visual indication 602 may also include a communication address to which the message was directed, such as a telephone number 606. In a particular embodiment, the visual indication 602 may include a visual device 604 that identifies the communication device, party, or any combination thereof to which the message was directed.

Figure 7:
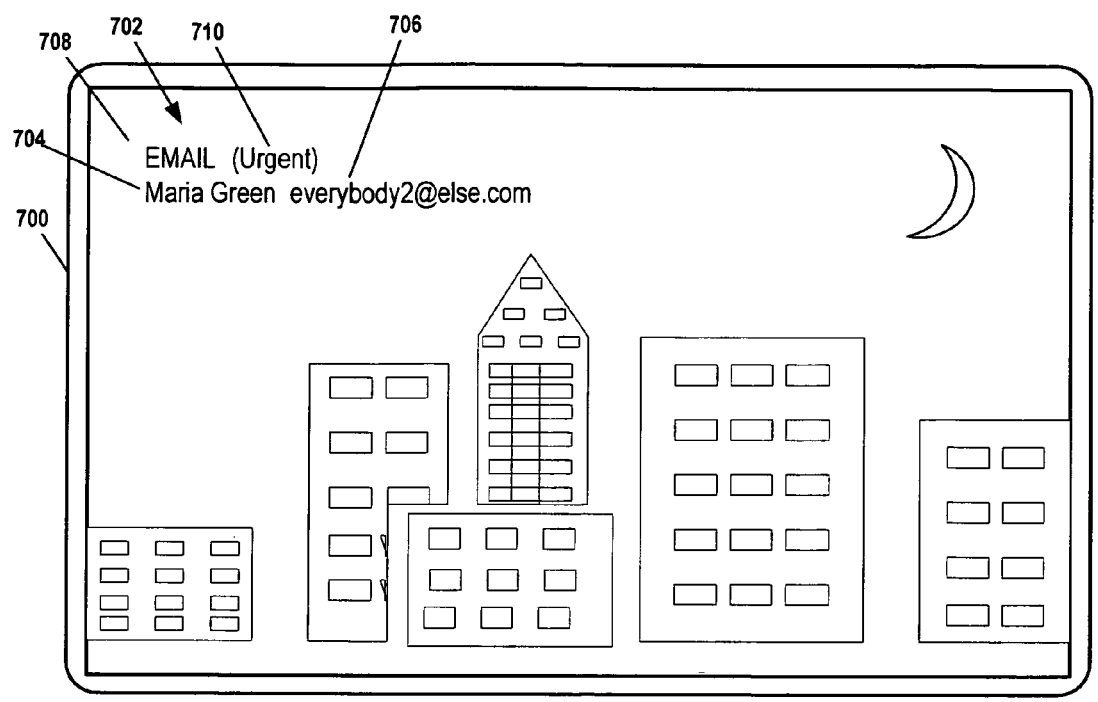
FIG. 7 is an illustration of a third exemplary embodiment of a graphical user interface for message notification via a video distribution network.

FIG. 7 depicts a third exemplary embodiment of a graphical user interface for message notification via a video distribution network. In a particular embodiment, the interface 700 may include a visual indication 702 of a message. The visual indication 702 may include a type 708 of the message, such as "email." The visual indication 702 may also include a communication address to which the message was directed, such as an email address 706. In a particular embodiment, the visual indication 702 may include a visual device 704 that identifies the communication device, party, or any combination thereof to which the message was directed. In a particular illustrative embodiment, the visual indication 702 may also include an indication of the urgency of the message, such as "urgent" text 710.

In a particular embodiment, the visual indications 502, 602 and 702, depicted in FIGS. 5, 6, and 7, may include additional information, such as the communication address from which the message originated, the name or other identification of a party who sent the message, the time or date the message was sent, whether the message is new, the length of the message, the subject of the message, all or a portion of the content of the message, other information related to the message, or any combination thereof.

Figure 8:
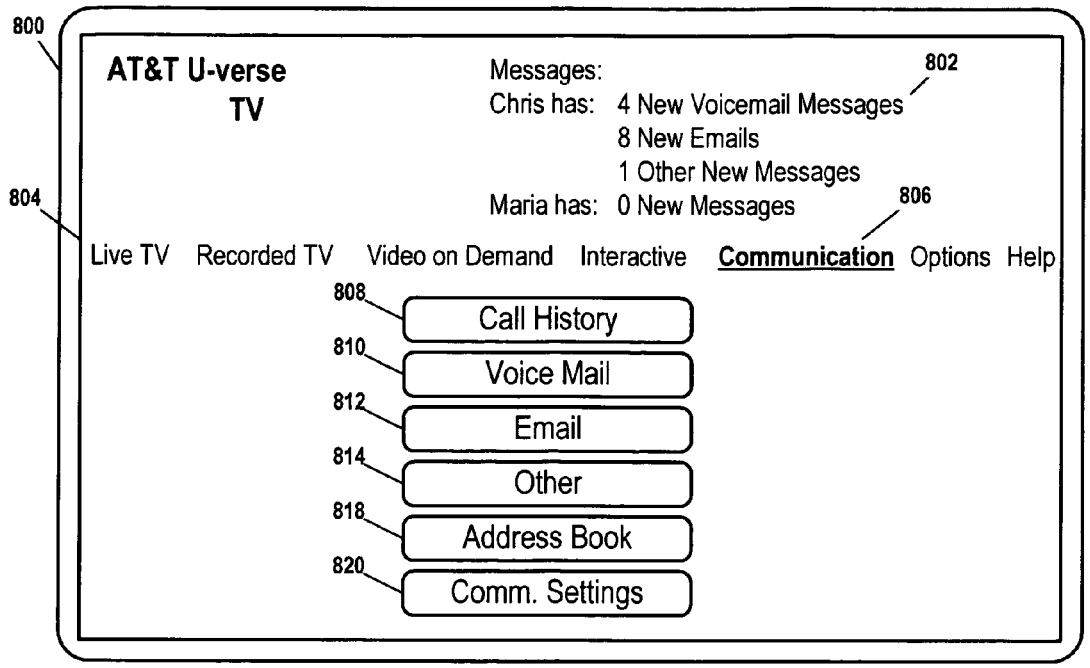
FIG. 8 is an illustration of a fourth exemplary embodiment of a graphical user interface for message notification and access via a video distribution network.

FIG. 8 depicts a fourth exemplary embodiment of a graphical user interface for message notification and access via a video distribution network. The interface 800 may be a user interface screen accessible via an internet protocol television (IPTV) network or at a set top box device communicating with an IPTV network. In a particular embodiment, the interface 800 may be part of a group of interfaces 804 that allow a user to access other services available via the video distribution network, such as a live television broadcast, a recorded television broadcast, video on demand, interactive programming, communication, user configuration settings and options, a help menu, other services, or any combination thereof.

In the particular embodiment illustrated in FIG. 8, the communication interface item 806 is selected. The interface 800 includes an indication of messages received 802. In an illustrative embodiment, the indication of messages received 802 may include a list of new messages of various types received by one or more subscribers. For example, as shown in FIG. 8, the indication of messages received 802 indicates that a first user, Chris, has 4 new voice mail messages, 8 new email messages, and 1 other new message. The indication of messages received 802 also indicates that a second user, Maria, has no new messages.

In a particular embodiment, a user may access communication services through the interface 800. In an illustrative embodiment, the interface 800 may include selectable indicators of a call history option 808, a voice mail option 810, an email option 812, an other option 814, an address book option 818, a communication settings option 820, or any combination thereof. Section of the call history indicator 808 may cause an interface screen to be displayed that identifies a listing of incoming and/or outgoing calls for one or more of the subscriber's telephones. Selection of the voice mail indicator 810 may cause an interface screen to be displayed which provides access to voice mail messages, such as the interface depicted in FIG. 10. Selection of the email indicator 812 may cause an interface screen to be displayed which provides access to email messages, such as the interface depicted in FIG. 14. Selection of the other indicator 814 may cause an interface screen to be displayed which provides access to messages that are not voice mail or email messages, such as facsimile messages, text messages, and so forth. Selection of the address book indicator 818 may cause an interface screen to be displayed that includes a list of contact information associated with one or more of the subscriber's communication addresses. Selection of the communication settings indicator 820 may cause an interface screen to be display which provides access to communication settings, such as the interface depicted in FIG. 9.

Figure 9:
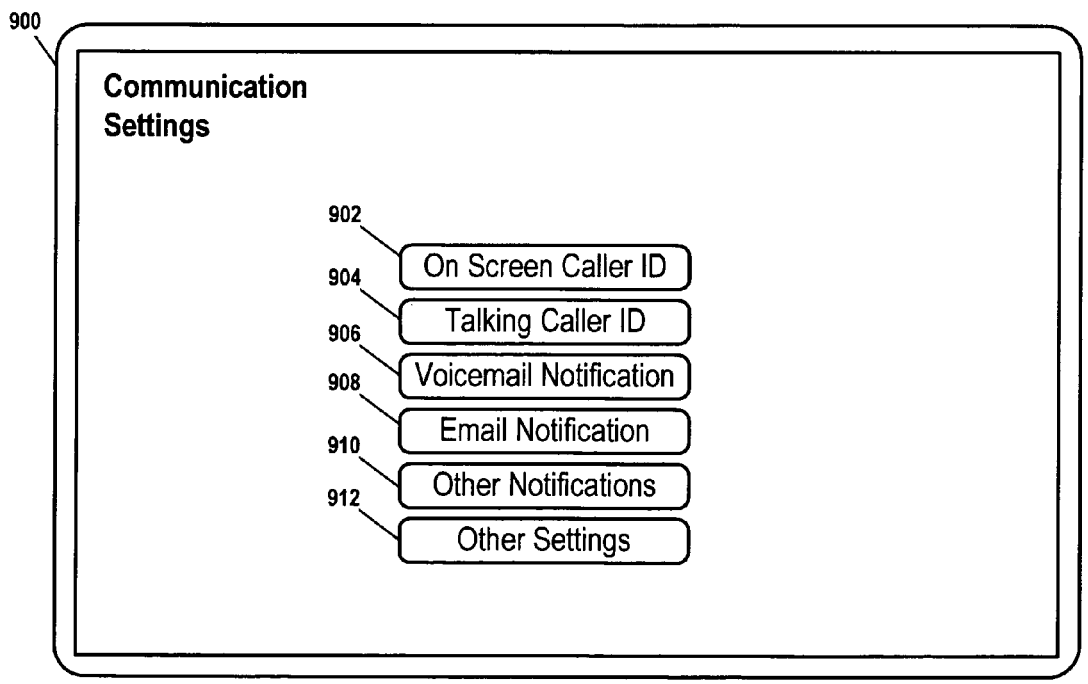
FIG. 9 is an illustration of a fifth exemplary embodiment of a graphical user interface for message notification and access via a video distribution network.

FIG. 9 depicts a fifth exemplary embodiment of a graphical user interface for message notification and access via a video distribution network. The interface 900 includes a plurality of selections that allow a subscriber to access and/or modify subscriber configuration settings. In an illustrative embodiment, interface 900 may include an onscreen caller ID selection 902, a talking caller ID selection 904, a voice mail notification selection 906, an email notification selection 908, an other notifications selection 910, an other settings selection 912, or any combination thereof.

In a particular embodiment, a subscriber may configure on screen presentation of caller ID information by selecting the on screen caller ID indicator 902. The on screen caller ID configuration settings may include settings, such as whether to display caller ID information on screen; where to display the on screen caller ID information on a screen; when to display on screen caller ID information (e.g., only for certain callers, excluding certain callers, etc.); how to display the on screen caller ID information (e.g. the color scheme to use, etc.); other settings, or any combination thereof. The subscriber may also configure audible caller ID information by selecting talking caller ID indicator 904. The audible caller ID configuration settings may include settings, such as whether to use talking caller ID; when to use talking caller ID; other settings, or any combination thereof. In a particular embodiment, a subscriber may be able to configure settings not related to caller ID or particular types of messages by selecting the other settings indicator 912.

In a particular embodiment, a subscriber may be able to configure notification of voice mail settings by selecting the voice mail notification indicator 906. The notification of voice mail settings may include, for example, associating a particular visual device, other visual indication, or any combination thereof with one or more communication addresses. The notification of voice mail settings may also include settings indicating when to provide notification of receipt of a voice mail. For example, the subscriber may specify that notification should only be provided for urgent voice mail messages, for voice mail messages directed to a particular communication address, for voice mail messages received from a particular communication address, or any combination thereof.

In a particular embodiment, a subscriber may be able to configure notification of email settings by selecting the email notification indicator 908. The notification of email settings may include, for example, associating a particular visual device or other visual indication with one or more communication addresses. The notification of email settings may also include settings indicating when to provide notification of receipt of an email. For example, the subscriber may specify that notification should only be provided for urgent email messages, for email messages directed to a particular communication address, for email messages received from a particular communication address, or any combination thereof.

In a particular embodiment, a subscriber may be able to configure notification of other messages settings by selecting the other notifications indicator 910. The notification of other messages settings may include, for example, associating a particular visual device or other visual indication with one or more communication addresses. The notification of other messages settings may also include settings indicating when to provide notification of receipt of other types of messages. For example, the subscriber may specify that notification should only be provided for urgent fax or text messages, for fax or text messages directed to a particular communication address, for fax or text messages received from a particular communication address, or any combination thereof.

Figure 10:
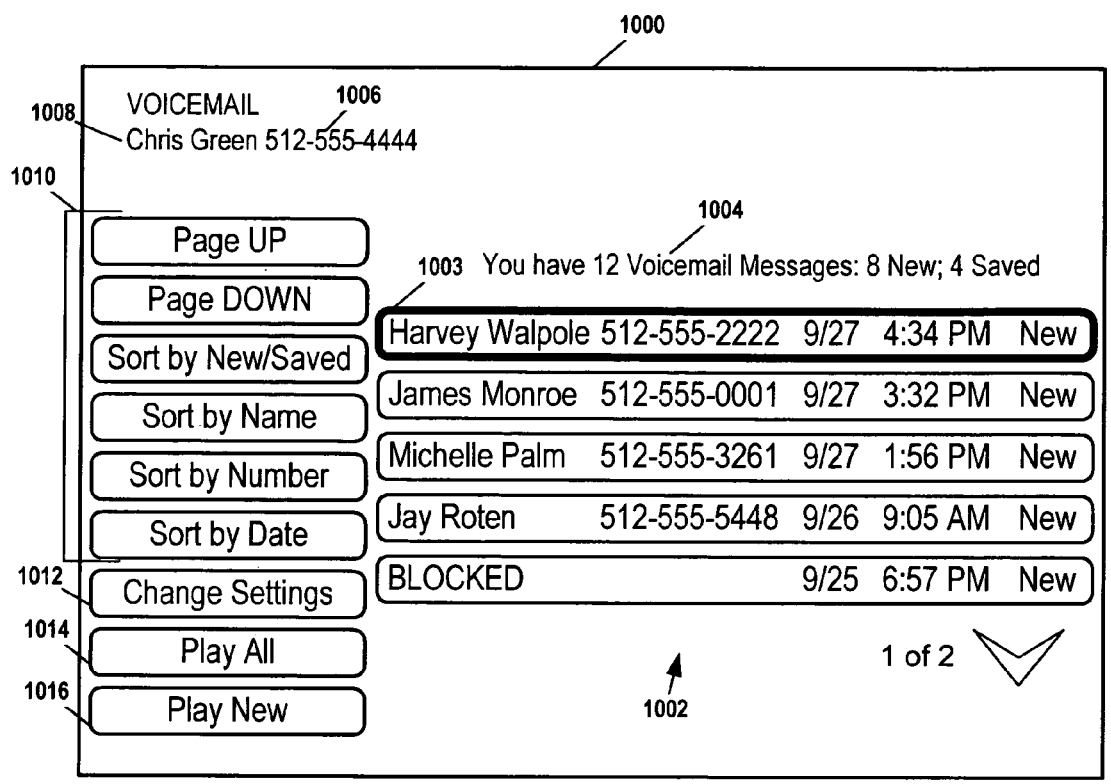
FIG. 10 is an illustration of a sixth exemplary embodiment of a graphical user interface for message notification and access via a video distribution network.

FIG. 10 depicts a sixth exemplary embodiment of a graphical user interface for message notification and access via a video distribution network. The interface 1000 may be accessed by selecting a voice mail selection from a communication menu, such as the interface depicted in FIG. 8.

In an illustrative embodiment, the interface 1000 may include a list of messages 1002. The subscriber may be able to access a message from the list of messages 1002 by selecting an indicator of the message, for example, by manipulating highlight bar 1003. The selected message may be played to the user, and a message playback interface, such as interface 1100 depicted in FIG. 11, may be displayed. In a particular embodiment, a voice to text conversion may be performed, and a selected voice mail message may be displayed as text.

The interface 1000 may also include a summary or other description 1004 related to the list of messages. For example, the description 1004 may identify how many messages are in the list, how many pages of messages are in the list, how many of the messages are new, how many of the messages have been saved, or any combination thereof. In a particular illustrative embodiment, each message identified in the list of messages 1002 may be identified by descriptive information such as the name of the caller, the communication address of the caller, the date and time the message was left, whether the message is new, other information, or any combination thereof.

In a particular embodiment, the interface 1000 may also include an identifier of the communication address to which the messages were directed, such as the name of a called party 1008, the telephone number called 1006, or any combination thereof. In a particular illustrative embodiment, the interface 1000 may include a plurality of selectable control indicators 1010 that allow the user to modify the list of messages 1002. For example the control indicators 1010 may include an indicator to advance to a previous page; to advance to a subsequent page; to sort the messages by different criteria such as whether the message is new, the name of the sender, the number of the sender, or the date the message was received; or any combination thereof. The interface 1000 may also include a selectable settings control indicator 1012 to access voice mail message settings.

In a particular illustrative embodiment, the interface 1000 may include a selectable play all control indicator 1014 that directs the system to play each of the voice mail messages without further user interaction. In a particular illustrative embodiment, the interface may include a selectable play new control indicator 1016 that directs the system to play each of the new voice mail messages without further user interaction.

Figure 11:
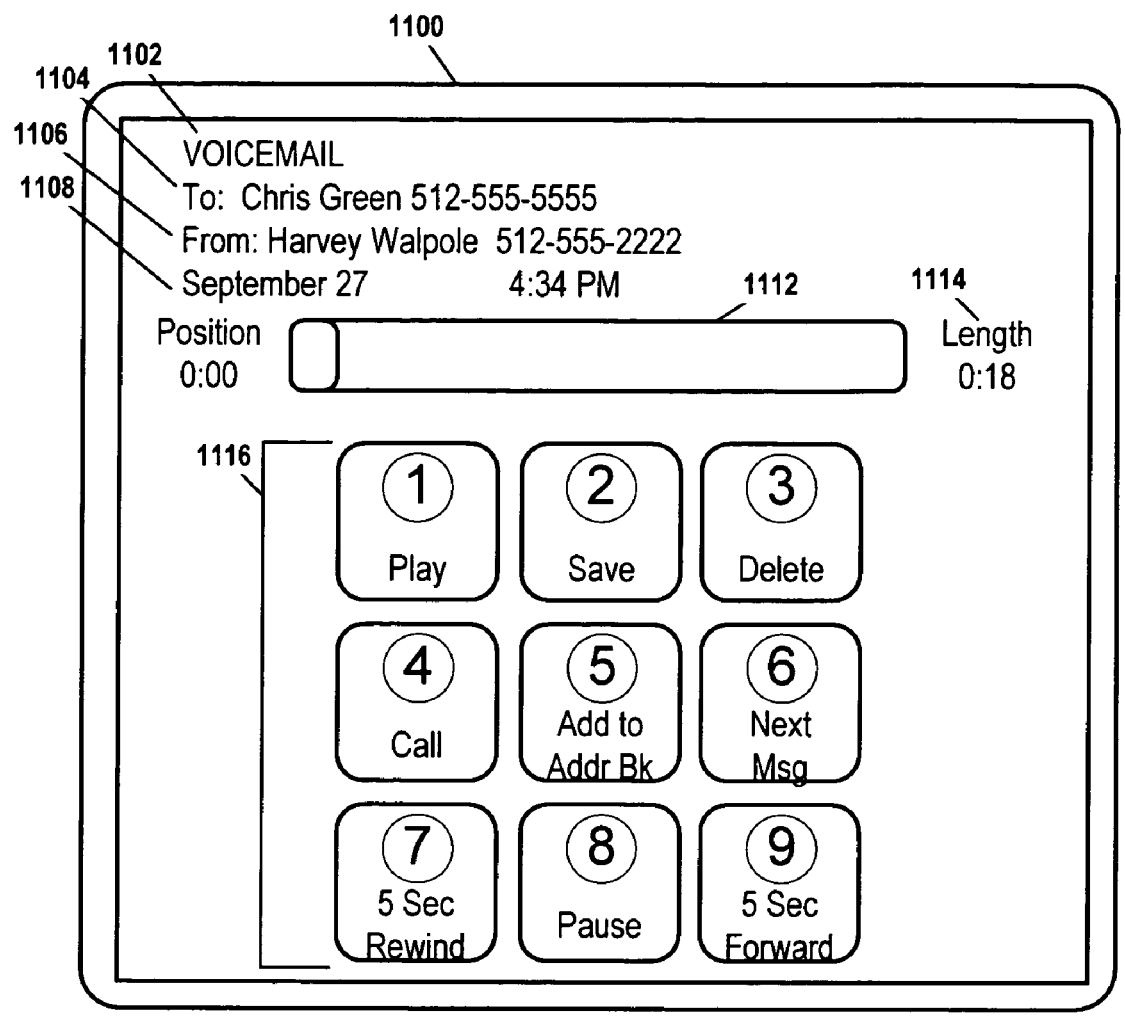
FIG. 11 is an illustration of a seventh exemplary embodiment of a graphical user interface for message notification and access via a video distribution network.

FIG. 11 depicts a seventh exemplary embodiment of a graphical user interface for message notification and access via a video distribution network. The interface 1100 includes a title 1102 indicating a type of message being accessed. The interface 1100 may also include an indication 1104 of a communication address, a subscriber, or any combination thereof, to which the message was directed. The interface 1100 may also include an indication 1106 of who left the message, from what communication address the message came, or any combination thereof. The interface 1100 may also include a date and time 1108 when the message was sent.

In a particular embodiment, the interface 1100 may also include an indication 1114 of the length of the message. The interface 1100 may also include an indication 1112 of how much of the message remains to be played back. The indication 1112 of how much of the message remains to be played back may include, for example, a graphic representation such as a progress bar, a textual representation such as a count down of remaining time, another indication of how much of the message remains, or any combination thereof.

In a particular embodiment, the interface 1100 may include a plurality of selectable message control indicators 1116. For example, the message control indicators 1116 may direct the subscriber to select a particular key on a remote control device to execute a particular message control command. Examples of message control commands may include playing a message, saving a message, deleting a message, calling the communication address from which the message originated, adding the communication address from which the message originate to an address book, advancing to a next message, rewinding the message, pausing playback of the message, fast forwarding the message, or any combination thereof. In the particular embodiment depicted in FIG. 11, the subscriber may execute a message control command by selecting a number key on the remote control device, which corresponds to a desired message control indicator 1116.

Figure 12:
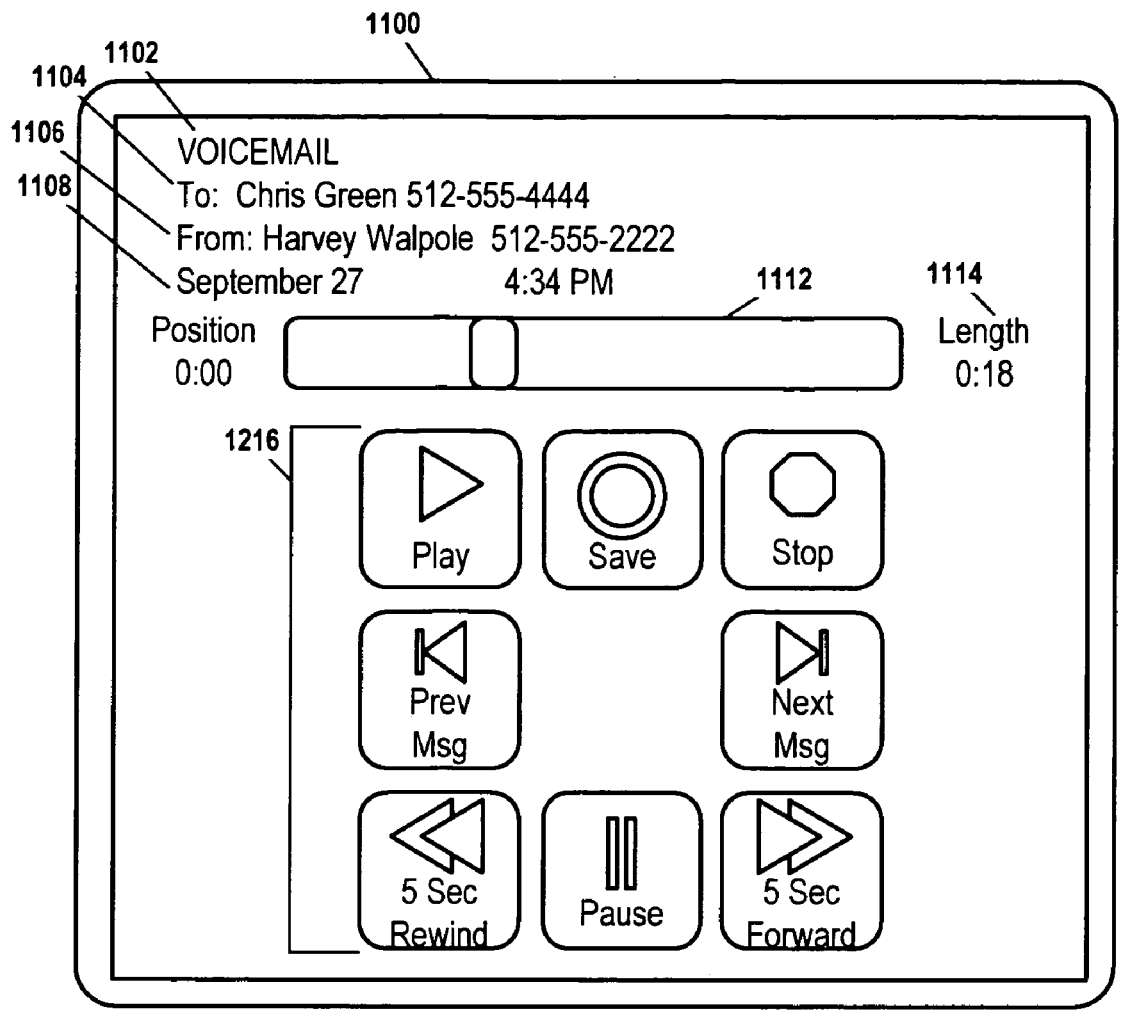
FIG. 12 is an illustration of a eighth exemplary embodiment of a graphical user interface for message notification and access via a video distribution network.

FIG. 12 depicts an eighth exemplary embodiment of a graphical user interface for message notification and access via a video distribution network. In the particular embodiment depicted in FIG. 12, the subscriber may execute message control commands by selecting transport keys on a remote control device. The interface 1100 may identify at 1216 which transport key is associated with each control command.

Figure 13:
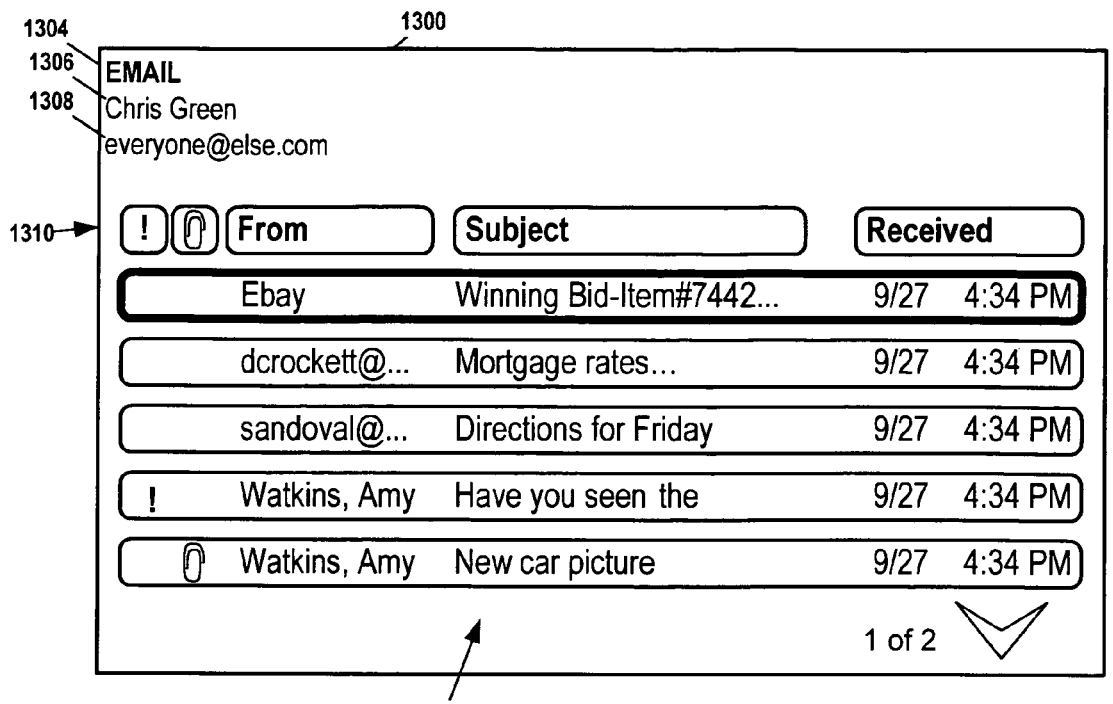
FIG. 13 is an illustration of a ninth exemplary embodiment of a graphical user interface for message notification and access via a video distribution network.

FIG. 13 depicts a ninth exemplary embodiment of a graphical user interface for message notification and access via a video distribution network. The interface 1300 includes a list 1302 of messages. The interface 1300 may also include an indication 1304 of a type of messages in the list 1302. In an illustrative embodiment, the interface 1300 may include a name 1306 of the subscriber to which the listed messages were sent. In an illustrative embodiment, the interface 1300 may include a communication address to which the messages were sent.

In a particular embodiment, the interface 1300 may include a plurality of selectable control indicators 1310 which allow the user to modify the order of the messages in the list 1302. For example, the control selections 1310 may allow the user to sort the list 1302 by urgency of the messages, whether the messages have attachments, who sent the messages, the subject of the messages, when the messages were received, and so forth.

Figure 14:
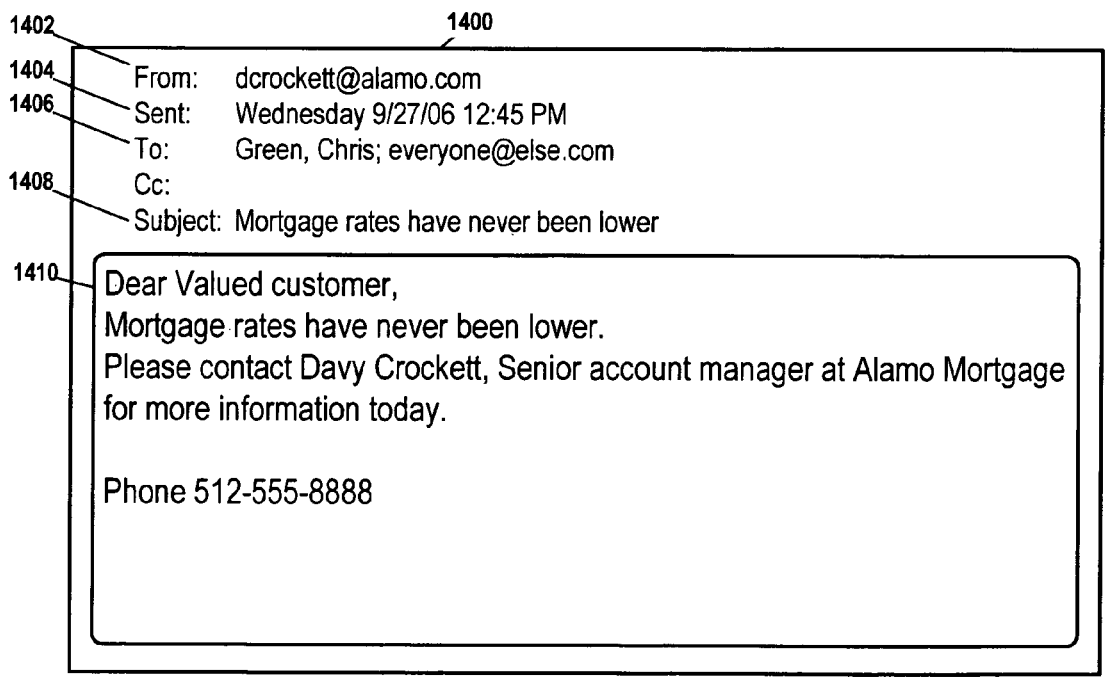
FIG. 14 is an illustration of a tenth exemplary embodiment of a graphical user interface for message notification and access via a video distribution network.

FIG. 14 depicts a tenth exemplary embodiment of a graphical user interface for message notification and access via a video distribution network. The interface 1400 includes an email message display including a sender 1402, a date and time sent 1404, to whom the message was sent 1406, a subject of the message 1408, and a body of the message 1410.

Figure 15:
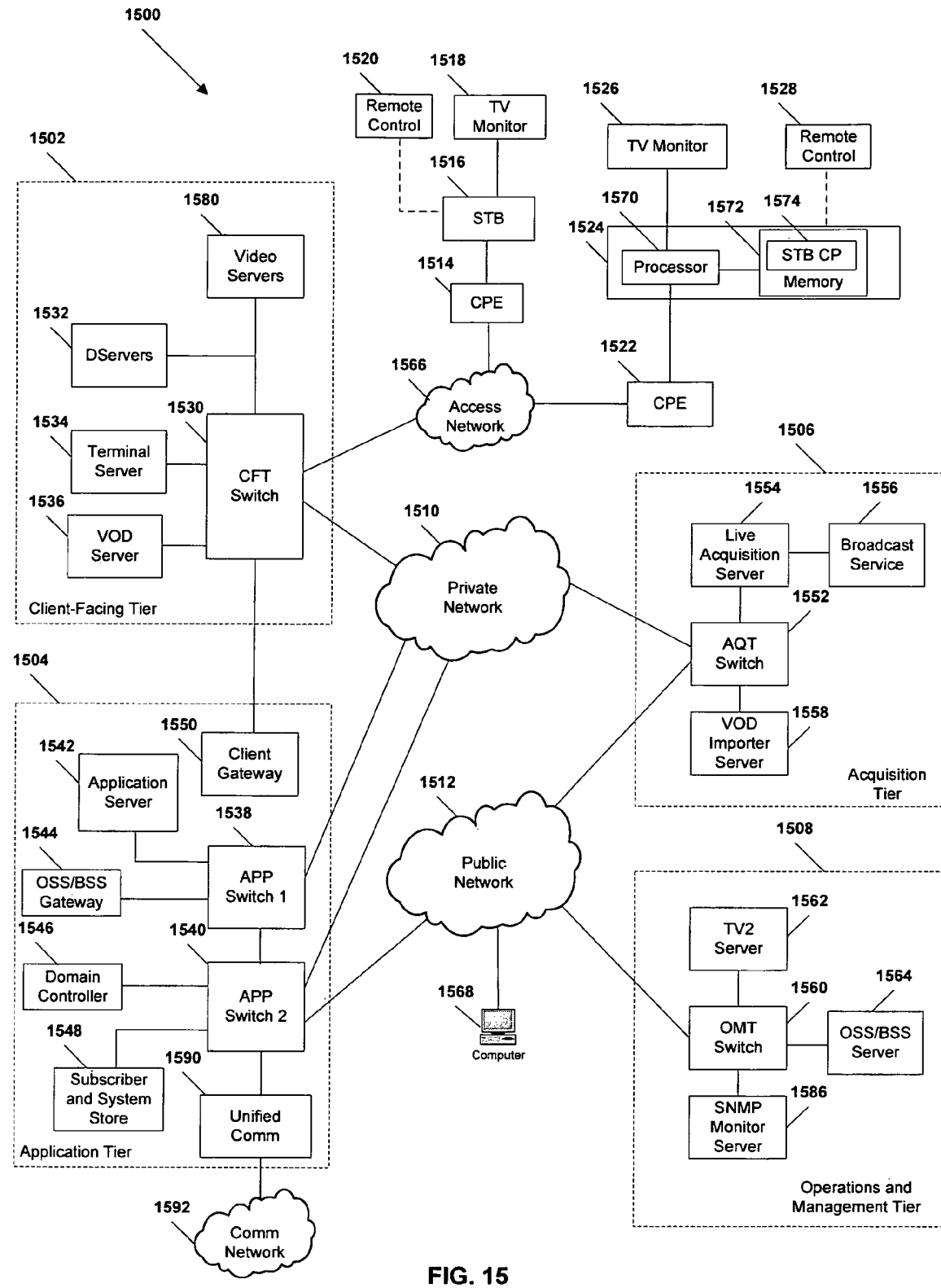
FIG. 15 is a block diagram of an illustrative video distribution system.

In a particular illustrative embodiment, the video distribution network as discussed above with reference to FIGS. 1-14 may include or be part of a cable television (CATV) network. In another particular illustrative embodiment, the video distribution network may include or be part of an internet protocol television (IPTV) system 1500, as depicted in FIG. 15. As shown, the system 1500 can include a client facing tier 1502, an application tier 1504, an acquisition tier 1506, and an operations and management tier 1508. Each tier 1502, 1504, 1506, 1508 is coupled to a private network 1510; to a public network 1512, such as the Internet; or to both the private network 1510 and the public network 1512. For example, the client-facing tier 1502 can be coupled to the private network 1510. Further, the application tier 1504 can be coupled to the private network 1510 and to the public network 1512. The acquisition tier 1506 can also be coupled to the private network 1510 and to the public network 1512. Additionally, the operations and management tier 1508 can be coupled to the public network 1512.

As illustrated in FIG. 15, the various tiers 1502, 1504, 1506, 1508 communicate with each other via the private network 1510 and the public network 1512. For instance, the client-facing tier 1502 may communicate with the application tier 1504 and the acquisition tier 1506 via the private network 1510. The application tier 1504 may communicate with the acquisition tier 1506 via the private network 1510. Further, the application tier 1504 may communicate with the acquisition tier 1506 and the operations and management tier 1508 via the public network 1512. Moreover, the acquisition tier 1506 may communicate with the operations and management tier 1508 via the public network 1512. In a particular embodiment, elements of the application tier 1504, including, but not limited to, a client gateway 1550, may communicate directly with the client-facing tier 1502.

The client-facing tier 1502 may communicate with user equipment via an access network 1566, such as an Internet Protocol Television (IPTV) access network. In an illustrative embodiment, customer premises equipment (CPE) 1514, 1522 can be coupled to a local switch, router, or other device of the access network 1566. The client-facing tier 1502 may communicate with a first representative set-top box device 1516 via the first CPE 1514 and with a second representative set-top box device 1524 via the second CPE 1522. In a particular embodiment, the first representative set-top box device 1516 and the first CPE 1514 may be located at a first customer premise, and the second representative set-top box device 1524 and the second CPE 1522 may be located at a second customer premise. In another particular embodiment, the first representative set-top box device 1516 and the second representative set-top box device 1524 may be located at a single customer premise, both coupled to one of the CPE 1514, 1522. The CPE 1514, 1522 may include routers, local area network devices, modems, such as digital subscriber line (DSL) modems, any other suitable devices for facilitating communication between a set-top box device and the access network 1566, or any combination thereof.

In an exemplary embodiment, the client-facing tier 1502 may be coupled to the CPE 1514, 1522 via fiber optic cables. In another exemplary embodiment, the CPE 1514, 1522 may be digital subscriber line (DSL) modems that are coupled to one or more network nodes via twisted pairs, and the client-facing tier 1502 may be coupled to the network nodes via fiber-optic cables. Each set-top box device 1516, 1524 may process data received via the access network 1566, via an IPTV software platform, such as Microsoft® TV IPTV Edition.

The first set-top box device 1516 may be coupled to a first external display device, such as a first television monitor 1518, and the second set-top box device 1524 may be coupled to a second external display device, such as a second television monitor 1526. Moreover, the first set-top box device 1516 may communicate with a first remote control 1520, and the second set-top box device 1524 may communicate with a second remote control 1528. The set-top box devices 1516, 1524 may include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 1516, 1524 can receive data, video, or any combination thereof, from the client-facing tier 1502 via the access network 1566 and render or display the data, video, or any combination thereof, at the display device 1518, 1526 to which it is coupled. In an illustrative embodiment, the set-top box devices 1516, 1524 can include tuners that receive and decode television programming signals or packet streams for transmission to the display devices 1518, 1526. Further, the set-top box devices 1516, 1524 can include a STB processor 1570 and a STB memory device 1572 that is accessible to the STB processor 1570. In one embodiment, a computer program, such as the STB computer program 1574, can be embedded within the STB memory device 1572.

In an illustrative embodiment, the client-facing tier 1502 can include a client-facing tier (CFT) switch 1530 that manages communication between the client-facing tier 1502 and the access network 1566 and between the client-facing tier 1502 and the private network 1510. As illustrated, the CFT switch 1530 is coupled to one or more data servers, such as D-servers 1532, that store, format, encode, replicate, or otherwise manipulate or prepare video content for communication from the client-facing tier 1502 to the set-top box devices 1516, 1524. The CFT switch 1530 can also be coupled to a terminal server 1534 that provides terminal devices with a connection point to the private network 1510. In a particular embodiment, the CFT switch 1530 can be coupled to a video-on-demand (VOD) server 1536 that stores or provides VOD content imported by the IPTV system 1500. Further, the CFT switch 1530 is coupled to one or more video servers 1580 that receive video content and transmit the content to the set-top boxes 1516, 1524 via the access network 1566.

In an illustrative embodiment, the client-facing tier 1502 can communicate with a large number of set-top boxes, such as the representative set-top boxes 1516, 1524 over a wide geographic area, such as a metropolitan area, a viewing area, a statewide area, a regional area, a nationwide area or any other suitable geographic area, market area, or subscriber or customer group that can be supported by networking the client-facing tier 1502 to numerous set-top box devices. In a particular embodiment, the CFT switch 1530, or any portion thereof, can include a multicast router or switch that communicates with multiple set-top box devices via a multicast-enabled network.

As illustrated in FIG. 15, the application tier 1504 can communicate with both the private network 1510 and the public network 1512. The application tier 1504 can include a first application tier (APP) switch 1538 and a second APP switch 1540. In a particular embodiment, the first APP switch 1538 can be coupled to the second APP switch 1540. The first APP switch 1538 can be coupled to an application server 1542 and to an OSS/BSS gateway 1544. In a particular embodiment, the application server 1542 can provide applications to the set-top box devices 1516, 1524 via the access network 1566, which enable the set-top box devices 1516, 1524 to provide functions, such as interactive program guides, video gaming, display, messaging, processing of VOD material and other IPTV content, etc. In an illustrative embodiment, the application server 1542 can provide location information to the set-top box devices 1516, 1524. In a particular embodiment, the OSS/BSS gateway 1544 includes operation systems and support (OSS) data, as well as billing systems and support (BSS) data. In one embodiment, the OSS/BSS gateway 1544 can provide or restrict access to an OSS/BSS server 1564 that stores operations and billing systems data.

The second APP switch 1540 can be coupled to a domain controller 1546 that provides Internet access, for example, to users at their computers 1568 via the public network 1512. For example, the domain controller 1546 can provide remote Internet access to IPTV account information, e-mail, personalized Internet services, messaging services or other online services via the public network 1512. In addition, the second APP switch 1540 can be coupled to a subscriber and system store 1548 that includes account information, such as account information that is associated with users who access the IPTV system 1500 via the private network 1510 or the public network 1512. In an illustrative embodiment, the subscriber and system store 1548 can store subscriber or customer data and create subscriber or customer profiles that are associated with IP addresses, stock-keeping unit (SKU) numbers, other identifiers, or any combination thereof, of corresponding set-top box devices 1516, 1524. In another illustrative embodiment, the subscriber and system store can store data associated with capabilities of set-top box devices associated with particular customers.

In a particular illustrative embodiment, the second APP switch 1540 may be coupled to a unified communication server 1590. The unified communication server 1590 may be in communication with one or more communication networks 1592. For example, the unified communication server 1590 may communicate with a telephone network, a wireless telephone network, the Internet, or another communication network. The unified communication server 1590 may receive and store messages directed to communication addresses of subscribers. The unified communication server 1590 may send notification of receipt of a message to a subscriber via the access network 1566. The unified communication server 1590 may also send contents of the message to the subscriber via the access network 1566.

In a particular embodiment, the application tier 1504 can include a client gateway 1550 that communicates data directly to the client-facing tier 1502. In this embodiment, the client gateway 1550 can be coupled directly to the CFT switch 1530. The client gateway 1550 can provide user access to the private network 1510 and the tiers coupled thereto. In an illustrative embodiment, the set-top box devices 1516, 1524 can access the IPTV system 1500 via the access network 1566, using information received from the client gateway 1550. User devices can access the client gateway 1550 via the access network 1566, and the client gateway 1550 can allow such devices to access the private network 1510 once the devices are authenticated or verified. Similarly, the client gateway 1550 can prevent unauthorized devices, such as hacker computers or stolen set-top box devices from accessing the private network 1510, by denying access to these devices beyond the access network 1566.

For example, when the first representative set-top box device 1516 accesses the client-facing tier 1502 via the access network 1566, the client gateway 1550 can verify subscriber information by communicating with the subscriber and system store 1548 via the private network 1510. Further, the client gateway 1550 can verify billing information and status by communicating with the OSS/BSS gateway 1544 via the private network 1510. In one embodiment, the OSS/BSS gateway 1544 can transmit a query via the public network 1512 to the OSS/BSS server 1564. After the client gateway 1550 confirms subscriber and/or billing information, the client gateway 1550 can allow the set-top box device 1516 to access IPTV content and VOD content at the client-facing tier 1502. If the client gateway 1550 cannot verify subscriber information for the set-top box device 1516, e.g., because it is connected to an unauthorized twisted pair, the client gateway 1550 can block transmissions to and from the set-top box device 1516 beyond the access network 1566.

As indicated in FIG. 15, the acquisition tier 1506 includes an acquisition tier (AQT) switch 1552 that communicates with the private network 1510. The AQT switch 1552 can also communicate with the operations and management tier 1508 via the public network 1512. In a particular embodiment, the AQT switch 1552 can be coupled to a live acquisition server 1554 that receives or acquires television content, movie content, advertisement content, other video content, or any combination thereof, from a broadcast service 1556, such as a satellite acquisition system or satellite head-end office. In a particular embodiment, the live acquisition server 1554 can transmit content to the AQT switch 1552, and the AQT switch 1552 can transmit the content to the CFT switch 1530 via the private network 1510.

In an illustrative embodiment, content can be transmitted to the D-servers 1532, where it can be encoded, formatted, stored, replicated, or otherwise manipulated and prepared for communication from the video server(s) 1580 to the set-top box devices 1516, 1524. The CFT switch 1530 can receive content from the video server(s) 1580 and communicate the content to the CPE 1514, 1522 via the access network 1566. The set-top box devices 1516, 1524 can receive the content via the CPE 1514, 1522, and can transmit the content to the television monitors 1518, 1526. In an illustrative embodiment, video or audio portions of the content can be streamed to the set-top box devices 1516, 1524.

Further, the AQT switch 1552 can be coupled to a video-on-demand importer server 1558 that receives and stores television or movie content received at the acquisition tier 1506 and communicates the stored content to the VOD server 1536 at the client-facing tier 1502 via the private network 1510. Additionally, at the acquisition tier 1506, the video-on-demand (VOD) importer server 1558 can receive content from one or more VOD sources outside the IPTV system 1500, such as movie studios and programmers of non-live content. The VOD importer server 1558 can transmit the VOD content to the AQT switch 1552, and the AQT switch 1552, in turn, can communicate the material to the CFT switch 1530 via the private network 1510. The VOD content can be stored at one or more servers, such as the VOD server 1536.

When users issue requests for VOD content via the set-top box devices 1516, 1524, the requests can be transmitted over the access network 1566 to the VOD server 1536, via the CFT switch 1530. Upon receiving such requests, the VOD server 1536 can retrieve the requested VOD content and transmit the content to the set-top box devices 1516, 1524 across the access network 1566, via the CFT switch 1530. The set-top box devices 1516, 1524 can transmit the VOD content to the television monitors 1518, 1526. In an illustrative embodiment, video or audio portions of VOD content can be streamed to the set-top box devices 1516, 1524.

FIG. 15 further illustrates that the operations and management tier 1508 can include an operations and management tier (OMT) switch 1560 that conducts communication between the operations and management tier 1508 and the public network 1512. In the embodiment illustrated by FIG. 15, the OMT switch 1560 is coupled to a TV2 server 1562. Additionally, the OMT switch 1560 can be coupled to an OSS/BSS server 1564 and to a simple network management protocol (SNMP) monitor 1586 that monitors network devices within or coupled to the IPTV system 1500. In a particular embodiment, the OMT switch 1560 can communicate with the AQT switch 1552 via the public network 1512.

In an illustrative embodiment, the live acquisition server 1554 can transmit content to the AQT switch 1552, and the AQT switch 1552, in turn, can transmit the content to the OMT switch 1560 via the public network 1512. In this embodiment, the OMT switch 1560 can transmit the content to the TV2 server 1562 for display to users accessing the user interface at the TV2 server 1562. For example, a user can access the TV2 server 1562 using a personal computer 1568 coupled to the public network 1512.

In a particular embodiment, the unified communication server 1590 receives a message directed to a communication address of a subscriber. The unified communication server 1590 sends a notification of the message via the access network 1566 to a set top box device 1516 of the subscriber. The set top box device 1516 receives a data stream including video content from the IPTV system 1500. The set top box device 1516 also receives the notification of the message. The set top box device 1516 or the unified communication server 1590 selects a first visual indication based at least in part on the communication address. The set top box device 1516 sends a display signal to display the video content and the first visual indication at television monitor 1518.

Figure 16:
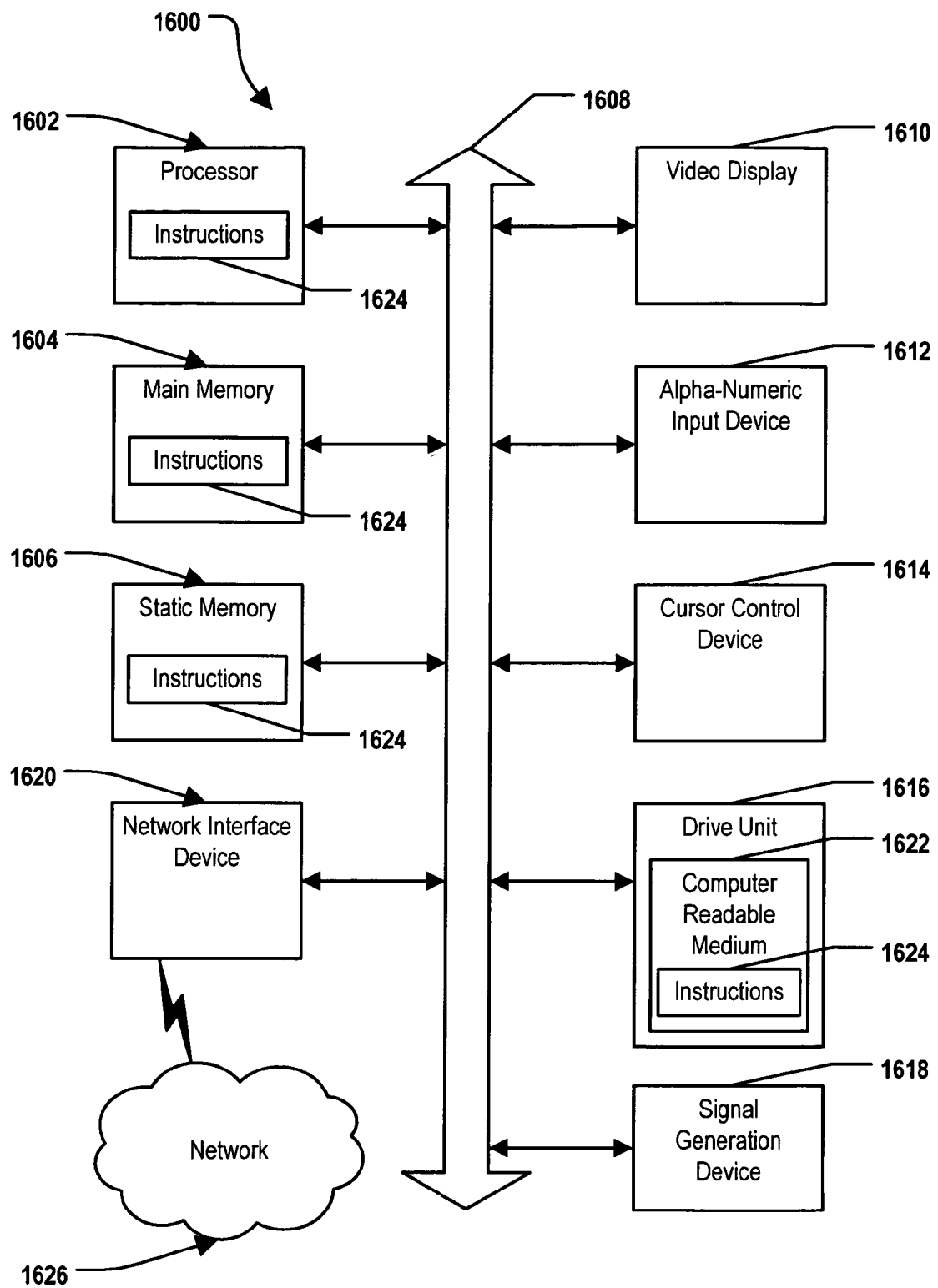
FIG. 16 is a block diagram of an illustrative general computer system.

Referring to FIG. 16, an illustrative embodiment of a general computer system is shown and is designated 1600. The computer system 1600 can include a set of instructions that can be executed to cause the computer system 1600 to perform any one or more of the methods or computer based functions disclosed herein. The computer system 1600 may operate as a standalone device or may be connected, e.g., using a network, to other computer systems or peripheral devices, such as a STB, or network server, as illustrated in FIGS. 1, 2, 4 and 15.

In a networked deployment, the computer system may operate in the capacity of a server or as a client user computer in a server-client user network environment, or as a peer computer system in a peer-to-peer (or distributed) network environment. The computer system 1600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1600 can be implemented using electronic devices that provide voice, video or data communication. Further, while a single computer system 1600 is illustrated, the term "system" shall also be taken to include any collection of systems or sub-systems that individually or jointly execute a set, or multiple sets, of instructions to perform one or more computer functions.

As illustrated in FIG. 16, the computer system 1600 may include a processor 1602, e.g., a central processing unit (CPU), a graphics processing unit (GPU), or both. Moreover, the computer system 1600 can include a main memory 1604 and a static memory 1606, that can communicate with each other via a bus 1608. As shown, the computer system 1600 may further include a video display unit 1610, such as a liquid crystal display (LCD), an organic light emitting diode (OLED), a flat panel display, a solid state display, or a cathode ray tube (CRT). Additionally, the computer system 1600 may include an input device 1612, such as a keyboard, and a cursor control device 1614, such as a mouse. The computer system 1600 can also include a disk drive unit 1616, a signal generation device 1618, such as a speaker or remote control, and a network interface device 1620.

In a particular embodiment, as depicted in FIG. 16, the disk drive unit 1616 may include a computer-readable medium 1622 in which one or more sets of instructions 1624, e.g. software, can be embedded. Further, the instructions 1624 may embody one or more of the methods or logic as described herein. In a particular embodiment, the instructions 1624 may reside completely, or at least partially, within the main memory 1604, the static memory 1606, and/or within the processor 1602 during execution by the computer system 1600. The main memory 1604 and the processor 1602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1624 or receives and executes instructions 1624 responsive to a propagated signal, so that a device connected to a network 1626 can communicate voice, video or data over the network 1626. Further, the instructions 1624 may be transmitted or received over the network 1626 via the network interface device 1620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   receiving, via an internet protocol television network, a data stream comprising video content;
   receiving, via the internet protocol television network, a notification of a message directed to a communication address associated with a subscriber; and
   selecting a first visual message indication based at least partially on the communication address.

2. The method of claim 1, further comprising sending the video content and the first visual message indication to a display device.

3. The method of claim 1, wherein selecting the first visual message indication comprises:
   determining to which of a plurality of communication addresses associated with the subscriber the message is directed; and
   selecting a visual indication that identifies the communication address uniquely among the plurality of communication addresses.

4. The method of claim 1, wherein the first visual message indication is selected based on a type of the message.

5. The method of claim 1, wherein the first visual message indication is selected based on an urgency of the message.

6. The method of claim 1, wherein the first visual message indication is selected based on subscriber configuration settings.

7. The method of claim 6, wherein the subscriber configuration settings are configurable via a user interface displayed at a display device.

8. The method of claim 7, wherein the subscriber configuration settings are configurable via a user interface accessible via the Internet.

9. The method of claim 1, further comprising sending the video content to a video recording device, without the first visual message indication.

10. The method of claim 1, further comprising receiving the message via the internet protocol television network and sending the message to a display device.

11. The method of claim 10, further comprising authenticating an identity of the subscriber before sending the message to the display device.

12. The method of claim 11, wherein authenticating the identity of the subscriber comprises receiving an authentication token from the subscriber.

13. The method of claim 12, wherein the authentication token is an identification used to access messages via a communication device associated with the communication address.

14. The method of claim 1, wherein the communication address is a voice over internet protocol communication address.

15. A set top box device, comprising:
    at least one network interface to receive via an internet protocol television network a data stream including video content and a notification of a message directed to a communication address of a subscriber;
    logic to select a first visual message indicator based at least partially on the communication address.

16. The set top box device of claim 15, wherein the logic selects the first visual message indicator based at least partially on content of the message.

17. The set top box device of claim 15, wherein the network interface receives content of the message via the internet protocol television network.

18. The set top box device of claim 17, further comprising at least one output to send the video content and the first visual message indicator to a display device.

19. The set top box device of claim 18, wherein the at least one output sends the content of the message to the display device.

20. The set top box device of claim 15, further comprising a user interface module to receive control input from a user via a graphical user interface.

21. The set top box device of claim 20, wherein the control input includes a command to display contents of a plurality of messages one after another, without further control input.

22. The set top box device of claim 20, wherein the control input includes a command to initiate a call to a sender of the message.

23. The set top box device of claim 15, further comprising a memory to store user configuration settings, wherein the logic accesses the user configuration settings to select the first visual message indication.

24. The set top box device of claim 23, wherein the user configuration settings include a different visual message indication for each communication address of the subscriber.

25. A system comprising:
    a processor;
    a memory accessible to the processor, the memory including instructions executable by the processor to:
        send video content received via an access network of an internet protocol television system to a display device; and
        send a message notification indicator to the display device for concurrent display with the video content in response to a message notification received via the access network of the internet protocol television system, wherein the message notification indicator is selected based at least partially on the communication address of a destination device of the incoming message and a type of the incoming message.

26. The user interface of claim 25, wherein the message notification indicator overlays at least a portion of the video content.

27. The user interface of claim 25, wherein the message notification indicator is selected further based on an urgency of the message.

28. The user interface of claim 25, wherein the message notification indicator is selected further based on subscriber configuration settings.

29. The user interface of claim 25, further comprising content of the message.

30. The user interface of claim 29, further comprising a message duration indicator.

31. The user interface of claim 25, further comprising one or more graphical message playback controls.

32. The user interface of claim 31, wherein the graphical user interface controls include an initiate call to message sender selection.

33. A computer readable medium tangibly embodying instructions to manipulate a computing platform to:
    receive, via an internet protocol television network, an internet protocol television data stream comprising video content;
    receive, via the internet protocol television network, a notification of a message directed to a communication address associated with a subscriber; and
    send a first display signal to display the video content and a first visual message indication, wherein the first visual message indication is selected based at least partially on the communication address.

34. The computer readable medium of claim 33, wherein the first visual message indication is selected based at least partially on a type of the message.

35. The computer readable medium of claim 33, wherein the first visual message indication is selected based at least partially on an urgency of the message.

36. The computer readable medium of claim 33, wherein the first visual message indication is selected based at least partially on subscriber configuration settings.

37. A method of message notification via a cable television network, comprising:
    receiving user selection of at least one message indicator, wherein each message indicator of the at least one message indicator is associated with a communication address associated with a subscriber;
    receiving, via the cable television network, a broadcast signal comprising video content;
    receiving, via the cable television network, a notification of a message directed to a particular communication address associated with corresponding subscriber;
    selecting a first visual message indication based at least partially on a particular message indicator associated with the particular communication address; and
    sending the first visual message indication to a display device for concurrent display with the video content.

38. The method of claim 37, wherein the first visual message indication is selected based on subscriber configuration settings.

39. The method of claim 38, wherein the subscriber configuration settings are configurable via a user interface accessible via the Internet.

40. The method of claim 37, further comprising receiving the message via the cable television network and sending the message to a display device.

41. The method of claim 40, further comprising authenticating an identity of the subscriber before sending the message to the display device.

* * * * *